US009546766B2

(12) United States Patent
Brendle

(10) Patent No.: US 9,546,766 B2
(45) Date of Patent: Jan. 17, 2017

(54) LIGHT MODULE FOR A MOTOR VEHICLE HEADLAMP

(71) Applicant: Automotive Lighting Reutlingen GmbH, Reutlingen (DE)

(72) Inventor: Matthias Brendle, Tuebingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 286 days.

(21) Appl. No.: 14/264,761

(22) Filed: Apr. 29, 2014

(65) Prior Publication Data

US 2014/0321140 A1 Oct. 30, 2014

(30) Foreign Application Priority Data

Apr. 29, 2013 (DE) ........................ 10 2013 207 845

(51) Int. Cl.
*B60Q 1/00* (2006.01)
*F21S 8/10* (2006.01)

(52) U.S. Cl.
CPC ............ *F21S 48/12* (2013.01); *F21S 48/1159* (2013.01); *F21S 48/1225* (2013.01); *F21S 48/1241* (2013.01); *F21S 48/1266* (2013.01); *F21S 48/13* (2013.01); *F21S 48/137* (2013.01); *F21S 48/1323* (2013.01); *F21S 48/1388* (2013.01); *F21S 48/14* (2013.01); *F21S 48/145* (2013.01); *F21S 48/328* (2013.01)

(58) Field of Classification Search
CPC .................................................... B60Q 1/0041
USPC .......................................................... 362/545
See application file for complete search history.

(56) References Cited

U.S. PATENT DOCUMENTS

| | | | |
|---|---|---|---|
| 2005/0030759 | A1 | 2/2005 | Zollers |
| 2013/0051014 | A1 | 2/2013 | Sikkens et al. |
| 2014/0175978 | A1 | 6/2014 | Kobayashi |
| 2014/0307459 | A1 | 10/2014 | Brendle et al. |

FOREIGN PATENT DOCUMENTS

| | | | |
|---|---|---|---|
| DE | 102007052696 | A1 | 7/2008 |
| DE | 10 2008 013 603 | A1 | 9/2009 |
| DE | 10 2009 035 544 | A1 | 2/2011 |

(Continued)

OTHER PUBLICATIONS

DE 10 2013 207 845.5 Examination Report dated Jan. 29, 2014.

(Continued)

*Primary Examiner* — William Carter
(74) *Attorney, Agent, or Firm* — Howard & Howard Attorneys PLLC

(57) ABSTRACT

The present invention is directed toward light module for a motor vehicle headlamp that has numerous light sources, a primary lens, and a secondary lens. The primary lens is configured to collect light emitted from the light sources, and to convert this light to an intermediate light distribution having the form of a closed, illuminating surface area. The secondary lens has an object-side focal length, and the primary lens and the secondary lens are disposed such that the intermediate light distribution lies, at a spacing of this focal length, in the beam path in front of the secondary lens. The light emission surfaces of the light sources are separated from one another by spacings lying between them, and the primary lens is configured to distribute the light emitted from the light sources such that the spacings in the intermediate light distribution can no longer be perceived.

14 Claims, 11 Drawing Sheets

(56) References Cited

FOREIGN PATENT DOCUMENTS

| | | | |
|---|---|---|---|
| DE | 10 2009 053 581 | B3 | 3/2011 |
| DE | 10 2011 054 229 | A1 | 4/2013 |
| EP | 2119958 | A1 | 11/2009 |
| EP | 2 131 098 | A1 | 12/2009 |
| EP | 2500628 | A2 | 9/2012 |
| EP | 2789900 | A2 | 10/2014 |
| WO | 2013031210 | A1 | 3/2013 |

OTHER PUBLICATIONS

Communication dated Aug. 12, 2016 enclosing the European Search Report dated Aug. 4, 2016 issued by the European Patent Office in European Patent Application No. 14164995.4.

LIGHT MODULE FOR A MOTOR VEHICLE HEADLAMP

CROSS-REFERENCE TO RELATED APPLICATION

This application is based upon and claims priority to German Patent Application DE 102013207845.5 filed on Apr. 29, 2013.

BACKGROUND OF THE INVENTION

1. Field of Invention

The present invention relates to light modules for motor vehicles and, more specifically, to light modules for headlamps of motor vehicles.

2. Description of Related Art

A light modules for a motor vehicle headlamp, as known in the art, is an assembly that alone, or in conjunction with other light modules of the same headlamp or at least one other headlamp, generates a light distribution in the foreground of a motor vehicle conforming to government-mandated regulations, when used as intended in a motor vehicle. The known light module has numerous light sources, a primary lens, and a secondary lens, wherein the primary lens is designed to collect light emitted from the light sources and to convert the light into an intermediate light distribution having the form of a closed illuminating surface area. The secondary lens has an object-side focal length, and the primary lens and the secondary lens are disposed such that the intermediate light distribution lies at a spacing of this focal length in the light path in front of the secondary lens. Intermediate light distributions from light modules that are intended to generate a light distribution having a light/dark border are bordered on at least one side by a sharp edge. The secondary lens is a lens or a reflector and has an object-side focal plane, which is distinguished in that the contours lying therein are mapped in a foreground of the light module lying behind the secondary lens in the direction in which the light is propagated.

Recently, semiconductor light sources, such as light emitting diodes (LED), have been used more frequently as light sources in motor vehicle headlamps. Initially, primarily (signal) lights for high-end vehicles have been operated with light emitting diodes, and the automotive industry is moving toward the use LEDs in conjunction with of low and high beam lights for mid-range vehicles as well. As a result of this development, there is a need in the art for inexpensive low and high beam light modules using LEDs as the light source. Powerful LED low beam light modules are typically designed as projection headlamps, where a two-stage lens first generates a real intermediate image of the light emission surface of the light emitting diodes used as the light sources. So-called arrays including numerous light emitting diodes are used in order to generate a sufficiently large luminous flux. The light emission surface of an individual LED used in such an array is, for example, quadratic, and has an edge length of approximately one millimeter, for example. The individual LEDs are disposed within the array such that their light emission surfaces border one another directly, substantially without any spacing, such that an overall light emission surface of the array that appears to be coherent is obtained. The disadvantage with these light modules, in particular, is the high price for the projection lens, and the expensive LED arrays.

Reflection systems in which a reflector generates a low beam light distribution in a single reflection (single-stage lens) are substantially simpler in terms of their assembly. The light distribution is formed as a superimposing of numerous elementary images of the light sources. The imaging of the light sources with an infinitesimally small reflector zone is understood to be the light source image. In order to superimpose the light source images to form a homogenous light distribution, the light source itself should likewise have a uniform light density. Furthermore, the light source requires a sharp border, the imaging of which generates the sharp light/dark border for the low beam light distribution. As a result, the simple, inexpensive reflection lens requires an expensive LED array as the light source.

However, instead of using an LED array having a basically closed light emitting surface, numerous individual LEDs disposed at a spacing to one another (e.g.: SMD-LEDs, SMD: surface mounted design) can be used, wherein gaps between the LED chips (and thus, in particular, between the light emission surfaces) result in dark stripes in the light distribution. Moreover, by blurring the resulting stripes in the light distribution with control lenses on the reflector surface in order to obtain a homogenous light distribution, the maximum illumination is reduced, at least in terms of the chip width in relation to the sum of the chip width and the chip spacing. Thus, the average light intensity of a blurred light source of this type is lower, in comparison to an array in which the LED chips are disposed directly adjacent to one another, at least in the specified relationship. Because of the tolerances of the individual chips, and in conjunction with the color converting phosphor, the sides of the LED chips never really lie on a line, which results in unclear light/dark borders in the imaging of the array.

As is the case with projection systems, the light/dark border is not generated through the imaging of an aperture shutter with reflection systems. Rather, the light/dark border is composed of light source images having different orientations, whereby in conventional reflection systems the focal point lies substantially lower than with projection systems (beneath the light/dark border). This has a negative effect on the range because the range decreases when the brightness of the bright region lying just below the light/dark border diminishes. Moreover, it is not possible to obtain the high luminosity gradients at the light/dark border with reflector systems that are typical of projection systems.

Thus, the objective of the invention is to provide a light module, which is as compact as possible, that can be operated with inexpensive SMD-LEDs, and that does not require an expensive and voluminous projection lens. Furthermore, the power of the light module, in relation to the luminosity at the edge of the light/dark border of a low beam light distribution, and in relation to the steepness of the gradients of the brightness curve at a right angle to the light/dark border, should reach the level obtained with projection modules.

SUMMARY OF THE INVENTION

The present invention overcomes the disadvantages in the related art in a light module for a motor vehicle headlamp. The light module includes numerous light emitting diodes as the light sources, a primary lens, and a secondary lens. The primary lens is configured to collect light emitted from the light sources, and to convert this light into an intermediate light distribution having the form of a closed, illuminating surface area. The secondary lens has an object-side focal length, wherein the primary lens and the secondary lens are disposed such that the intermediate light distribution, at the spacing of this focal length, lies in the beam path in front of the secondary lens. The primary lens is a single-piece base body which includes collecting lens sub-regions. The chip in a light emitting diode lies between a collecting lens sub-region that collects light from this light emitting diode and its object-side focal point, wherein light emission surfaces of the light sources are separated from one another by spacings lying between them, and in that the primary lens is configured to distribute light emitted from the light sources such that the spacings in the intermediate light distribution cannot be perceived. Thus, the light emission surfaces of the light sources are separated from one another by spacings between them, and the primary lens is designed to distribute light emitted from the light sources such that the spacings in the intermediate light distribution cannot be perceived.

In one embodiment, the numerous light sources may be implemented as an LED array. Further, the secondary lens may have numerous facets, such that numerous light source-side focal points, or a focal line, are/is obtained. In particular, the secondary lens may have numerous object-side focal points. In the light path behind the intermediate light distribution, in one embodiment, an additional faceted reflector is disposed as the secondary lens. The reflector may be designed to generate a complete low beam light distribution from the intermediate light distribution, having an asymmetrical incline. The reflector can be replaced by a faceted lens having corresponding focal point positions. In another embodiment, the secondary lens is implemented as a faceted lens. As a result of the more favorable relationship of the focal length to the aperture (aperture value) in comparison with reflectors, there is a lower color aberration with the lens type secondary lens. In this way, the intermediate light distribution represents, to a certain extent, a surrogate light source having the required characteristics of appearing to be without stripes, and which can be used together with an inexpensive reflector system to generate a light distribution conforming to government-mandated regulations.

In one embodiment, the primary lens has its own optically effective sub-region for each light source, each of which has a light emission surface. These light emission surfaces border one another without spacing, and at least two adjacent light emission surfaces border one another such that at least one lateral edge of a first of two light emission surfaces bordering one another lies in a line, flush with a lateral edge of the second of the two light emission surfaces bordering one another, such that the two flush edges form a shared, straight edge. The primary lens may be a single-piece lens array, wherein a sub-region functioning as a lens is allocated to each LED in the form of a collecting primary lens, and wherein all primary lenses substantially border one another directly at their light emission surfaces. At least two of these lenses form a shared straight edge with their light emission surfaces. Moreover, each sub-region may be a collecting lens, where the lens array may be made up of plano-convex lenses of organic or inorganic glass, or silicone rubber (LSR). Organic glasses include, for example, polymethyl methacrylate (PMMA), cyclic olefin copolymer (COC), cyclic olefin polymer (COP), polycarbonate (PC), polysulfone (PSU), or polymethyl methacrylamide (PMMI). The lens may, at least in sections, have a straight edge on one side. In addition, the collecting lens array may be bordered on one edge, at least in sections, by a flat lateral surface, on which a portion of the light striking it is reflected. Alternatively, this edge can also be formed by an aperture shutter placed in the beam path directly in front of the light emission surfaces of the lens array. In one embodiment, each sub-region is a reflector, wherein the primary lens may be designed as a reflector array assembled from reflectors that expand conically toward the light emission, which may exhibit quadratic or rectangular cross-sections in planes perpendicular to the main beam direction of the LEDs. The reflectors may exhibit the geometry of a truncated pyramid. Moreover, the reflector array may consist of a metalized, high temperature-resistant plastic, in particular, a thermoplastic plastic. Well suited, high temperature resistant thermoplastics are, for example, polyether ether ketone, polyetherimide, or polysulfone. The metallization may be, for example, of aluminum, silver, platinum, gold, nickel, chrome, copper, zinc, or alloys containing these metals. The metallization may subsequently be sealed by a transparent coating. Instead of the metallization, a multi-layer coating can be applied to the plastic body. With the multi-layer coating, numerous low and high refracting coatings are applied in an alternating manner. A further metal coating can be provided as a beam barrier beneath the reflecting metal or multi-layer coating. This metal coating is, for example, isolated on the plastic body of the reflector array in the form of a thick copper or nickel coating, and thus forms a protection against the thermal load resulting from the beams of the LEDs. This thick metal coating is also capable of conducting heat toward the edge of the reflector. A heat shield can also be provided between the reflector array and the LEDs, which shades the back surface of the reflector body from beams from the LEDs, and thus prevents overheating of the reflector material. The reflector array may have at least one straight edge forming the edge of a row of reflector sub-regions bordering light emission surfaces.

An another embodiment, each sub-region may be an optical fiber, wherein the primary lens may be designed as a fiber optic array including optical fibers expanding conically toward the light emission, which may exhibit quadratic or rectangular cross-sections in planes that are perpendicular to the main beam direction of the LEDs. The light entry surface of the individual optical fiber sub-region may be, in each case, disposed such that it is flat and parallel to the surface of the chip in the allocated LED. As a result, a greater portion of the luminous flux emitted from the LED is coupled in the optical fiber sub-region than with a convex curvature. Furthermore, a certain bundling already occurs as a result of the refraction. A further bundling occurs at the lateral walls of the optical fiber as a result of reflection, which is conditional to the shape expanding toward the light emission. The reflection occurring at the lateral walls also distinguishes optical fibers from lenses, which are likewise transparent solid bodies. With lenses, directional changes of the light only occur as a result of refraction, but not through reflection on the lateral walls. The light emission surfaces of the individual optical fibers may have a convex curvature. As a result, a bundling effect is obtained at the light emission. The optical fiber array may include one of the materials specified above for the lens material. The optical fiber array has at least one straight edge, composed of edges of individual light emission surfaces of adjacent optical fiber sub-regions that adjoin one another such that they are flush.

In one embodiment, the light module exhibits an aperture shutter, disposed in the beam path directly behind the light emission surface, such that it blocks a portion of the intermediate light distribution. The aperture shutter facilitates the generation of a sharp light/dark border in the intermediate light distribution, which have a beneficial effect on the sharpness of the light distribution conforming to government-mandated regulations that is to be generated in the foreground of the light module. The aperture shutter may be formed in the shape of a part that can be inserted, or as a two-component injection molded part formed on the primary lens, which advantageously results in a lower tolerance between the aperture shutter and the primary lens. The secondary lens may have at least one concave mirror reflector. A concave mirror reflector has the advantage of lower costs and a lower weight, in particular in comparison with transparent solid body such as lenses or secondary lenses functioning with internal total reflection. In order to obtain a sharp light/dark border, and thus a high illumination gradient, all of the reflectors may be disposed in the beam path such that the beam path is bent at the respective reflectors at an angle that is acute (<90°) to the greatest extent possible. The elementary images of the surrogate light source change very little in terms of their orientation due to the acute bending angle of the beam path, such that one can generate low beam light distributions having a good homogeneity (no longitudinal stripes in the light distribution), a high focal point (close beneath the low beam light/dark border), and a sharp light/dark border. Moreover, a lens surface of the secondary lens may be divided into a larger sub-region and a smaller sub-region, wherein the larger sub-region is defined in that it has a first object-side focal point, and in that the two sub-regions have a common image-side focal point extending into infinity. As a result, this secondary lens generates a image of the surrogate light source extending into infinity, and thus, a light distribution in the foreground of the light module, the shape of which depends on the intermediate light distribution, and thus on the shape of the surrogate light source, and having, in particular, a sharp light/dark border, if such is also present in the intermediate light distribution.

It is also preferred that the concave mirror reflector has a reflecting surface, the larger portion of which exhibits a parabolic form, wherein an object-side focal point of the parabolic form lies on the light emission surface of the primary lens.

The object-side focal point of the reflector preferably lies thereby on the edge of the surrogate light source. In order to generate a low beam light distribution, this is the lower edge of the surrogate light source. As described, this edge can be additionally shaded by an aperture shutter, in order to prevent diffused light from entering the dark field of the light distribution. If the secondary lens has numerous reflector facets, then their focal points may likewise lie on the edge of the surrogate light source. Depending on the position of the facets, they may, however, be positioned at different ends of the light source edge.

The secondary lens may include two mirrors disposed behind one another in the beam path such that they bend the beam path from the secondary lens twice at an acute angle, and such that the secondary lens has an object-side focal point lying on the light emission surface of the primary lens, and the image point thereof extends into infinity. As a result of the bending at an acute angle, the already specified advantages of a sharp light/dark border are obtained, because the acute angle substantially results in a maintaining of the orientation of the images from the surrogate light source parallel to the light/dark border. Moreover, the double bending also allows for the possibility of shortening the structural space for the light module, and provides a further degree of freedom for the configuration of the components of the light module. As a result, particularly compact light modules can be realized. Furthermore, constructive advantages are provided if the light source emits light toward the front in the direction of travel, and the cooling of the light source occurs toward the rear with a cooling element: a light source of this type can be readily replaced from the back of the headlamp. Furthermore, the cooling element on the back surface of the light module can be more readily ventilated, thus improving the cooling effect. As a result of the compact construction, there is the additional advantage that the balance point of the light module lies in the vicinity of the light emission surface, facilitating the mechanical pivoting of the light module for a headlight range adjustment and/or an adaptive headlight function. The bending of the beam path is also beneficial because the refractive power in the proposed lens system is divided between the primary lens and the secondary lens, such that one obtains secondary lenses having a lower refractive power, i.e. having a longer focal length (the focal lengths are 2-3 times greater than with single-stage systems). This is advantageous because one obtains a lens that is not affected by tolerances of the very long focal lengths in relation to the aperture. All chip images, furthermore, have nearly the same size and orientation. The first mirror in the beam path in the direction of propagation of the light may be a hyperboloid, and the second mirror may exhibit a paraboloid as the reflector surface, wherein the object-side focal point of the hyperboloid forms the object-side focal point of the secondary lens, and the image-side focal point of the hyperboloid coincides with the focal point of the paraboloid, and marks the position of a virtual intermediate image of the intermediate light distribution. The secondary lens may have numerous object-side focal points, and one or more common image-side focal points or focal lines extending into infinity. The first mirror of the two-stage secondary lens may exhibit a hyperboloid, or a flat mirror as a special case of the hyperboloid, and that the second mirror may have a faceted paraboloid, wherein the object-side focal point of the hyperboloid forms the object-side focal point of the secondary lens, and wherein the image-side focal point of the hyperboloid marks the position and orientation of a virtual intermediate image of the intermediate light distribution, and wherein the downstream parabolic facets are designed to focus the intermediate light distribution onto the border of the virtual image. The first mirror of the two-stage secondary lens may have a faceted hyperboloid or a faceted flat mirror, wherein the second mirror has a paraboloid, and the object-side focal point of the hyperboloid forms the object-side focal point of the secondary lens, and the image-side focal point of the hyperboloid marks the position and orientation of a virtual intermediate image of the intermediate light distribution, and the downstream parabolic facets in the beam path focus the intermediate light distribution onto the border of the virtual image.

In another embodiment, the two mirrors have numerous object-side focal points lying on the border of the intermediate light distribution, the focal points, or focal lines, respectively, of which lie on the light/dark border of the light distribution, extending to infinity, wherein the two mirror surfaces are shaped such that all optical paths between the object-side focal point and its respective image points, or image lines, respectively, are of the same length. With this design, the two mirrors of the two-stage secondary lens are not based on conical sections and do not deliver a sharp, undistorted intermediate image of the surrogate light source. However, the lens system has numerous object-side focal points lying on the border of the light emission surface of the primary lens, and the image points, or image lines, respectively, of which lie on the light/dark border of the light distribution, extending into infinity. A lens system having a deflection lens and a secondary lens does not necessarily have to provide a sharp virtual intermediate image, because aberrations (blurring, distortion, aperture malfunction) of the intermediate image can be compensated for by the downstream secondary lens.

Other objects, features and advantages of the present invention will be readily appreciated as the same becomes better understood after reading the subsequent description taken in connection with the accompanying drawings.

SUMMARY OF THE INVENTION

Figure 1A:
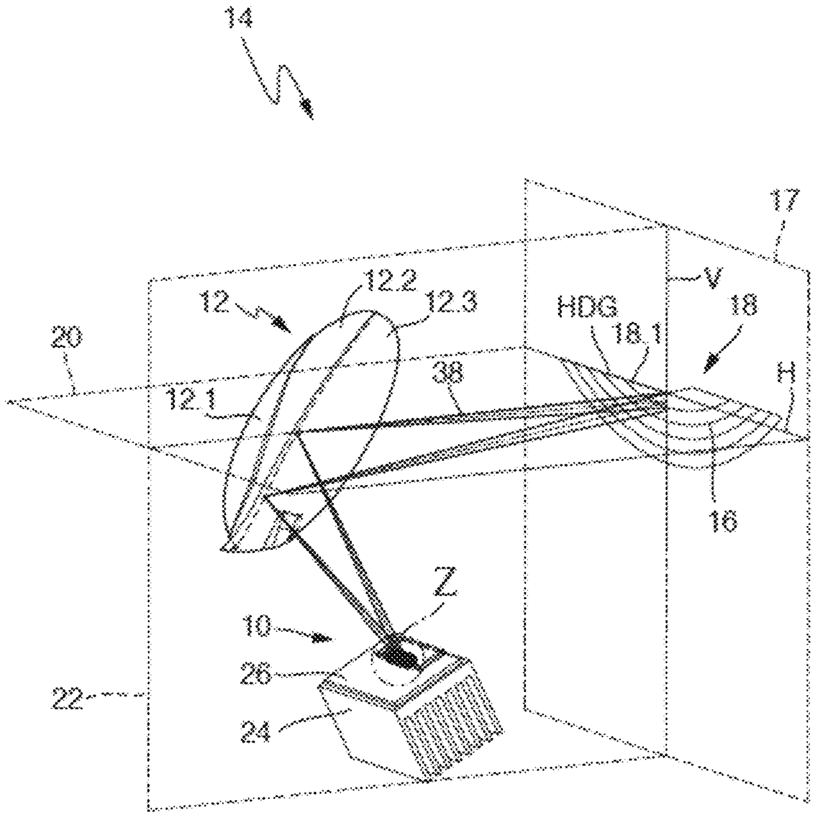
FIGS. 1A-1B show an embodiment example of a light module according to the invention, having a surrogate light source lying beneath the secondary lens.
Figure 1B:
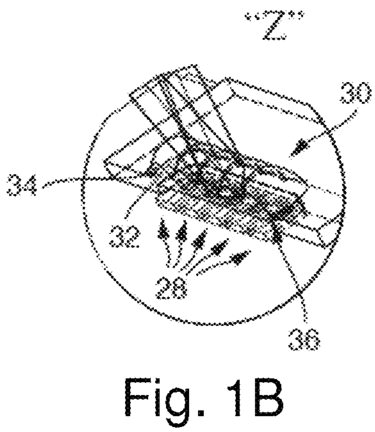

Referring now to the figures, where like numerals are used to designate like structure, FIGS. 1A-1B shows a spatial configuration of a light source assembly 10 and a secondary lens as an embodiment example of a light module 14 of to the present invention. Retaining structures, which define and fix this configuration in space, are not depicted throughout the figures for reasons of clarity. Thus, FIGS. 1A-1B is concentrated on the optical elements of the light module. The light source assembly 10 and the secondary lens 12 are disposed such that they generate a light distribution 16 conforming to government-mandated regulations on a screen 17 placed in the foreground of the light module. The light distribution 16 exhibits a light/dark border 18 running horizontally in sections in the depicted case.

With an intended use of the light module 14 in a motor vehicle headlamp of a motor vehicle standing on a flat surface, the part 18.1 of the horizontal light/dark border closer to the roadway runs substantially at the level of the horizon in front of the vehicle, or slightly (normally 0.57°) beneath it. The point at which the light/dark border bends upward lies substantially in the extension of the longitudinal axis of the vehicle. A vertical axis V running through this point intersects the horizontal axis H at a point on the screen that is also referred to as HV=(0, 0). For details regarding a light distribution of this type, reference is made to the explanations pertaining to FIGS. 9A-9B.

A sagittal plane 20 and a meridional plane 22 can be allocated to the lens systems for the light module 14. The sagittal plane 20 is parallel to the roadway at the level of the horizontal axis H. The meridional plane 22 is defined by the direction of the vertical axis V and an optical axis of the light module 14, which runs through the point HV=(0, 0). The light source assembly 10 includes a cooling element 24 and a printed circuit board 26 having SMD-LEDs 28 disposed thereon, and the associated primary lens. The SMD-LEDs, together with the associated primary lens 30 are depicted in an enlargement as detail Z. The SMD-LEDs 28 are disposed, depending on their design, such that their light emission surfaces border one another without spacing. The light emitted from these SMD-LEDs 28 is bundled by the primary lens 30 such that a coherent closed intermediate light distribution is established at the light emission surfaces of the primary lens 30 that are aligned with one another in a seamless manner. This intermediate light distribution, serving as a surrogate light source, is subsequently reproduced as a low beam light distribution 16 on a screen 17 placed at a distance in front of the light module 14. The lower edge 32 of the primary lens 30 is depicted thereby as a light/dark border of the low beam light distribution.

The reflector surface of the secondary lens 12 includes numerous reflector facets 12.1, 12.2, 12.3, which are implemented, for example, as paraboloids of revolution, at least in the region of their reflection surfaces. These regions include, in each case thereby, the larger portion of the reflection surface of a facet. The different paraboloids for different facets have different focal points 34, 36, all of which lie on the lower edge 32 of the light emission surface of the primary lens 30. The focal points 34, 36 may lie thereby on the corners of the primary lens 30. The meridional plane 22 divides the space of the lens system into two half-spaces. If the light source projects from below into the secondary mirror, then the mirror facets and their focal points lie in the same half-space. The axes of the paraboloids of revolution, on which the reflector facets are based, face toward the low beam light/dark border 18. In one embodiment, the light source edge is depicted as a light/dark border of the light distribution conforming to government-mandated regulations.

A main beam 38 from the beam path of the light module may be regarded as a representative light beam for the light module 14 depicted in FIGS. 1A-1B, which runs in the meridional plane 22. The main beam directions of the individual LEDs may be parallel to one another and are aligned with one another, in this respect. The observed light beam 38 runs in the main emission direction of the light sources 28, through the lower border of the light emission surface of the primary lens 30, and propagates in the direction of the reflector surface of the secondary lens 12. The main beam 38 is reflected at an acute angle (<90°) on the reflector surface, and deflected to a point on the light/dark border 18 of the light distribution 16 in the region H=0°, the vertical component of which normally lies at V=−0.57°.

Figure 2A:
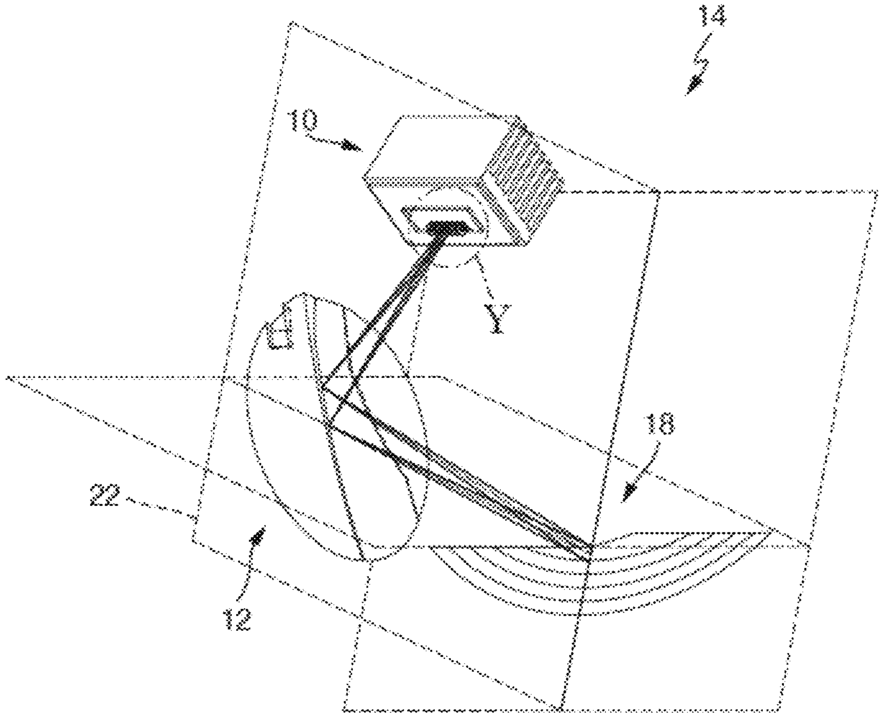
FIGS. 2A-2B shows an embodiment example of a light module according to the invention, having a surrogate light source lying above the secondary lens.
Figure 2B:
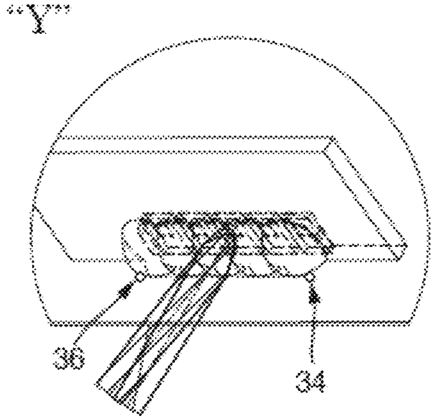

The subject matter of FIGS. 2A-2B differs from the subject matter of FIGS. 1A-1B in that the light source 10 is projected from above into the secondary reflector 12. The meridional plane 22 divides the space of the lens system into two half-spaces. If the light source projects from above into the reflector, the focal points of the parabolic facets lie on the other side of the meridional plane from the reflector facet itself, as is clear in comparison with FIGS. 1A-1B, by the focal points 34, 36 reversed from left to right in the detail Y. As a result of the other configuration of the light source, the sides of the focal points 34, 36 of the respective reflector facets are thus reversed. Thus, FIGS. 2A-2B likewise shows an LED low beam light module 14, having an asymmetrical light/dark border 18. In one embodiment, the objective of the primary lens 30 is that a sharply bordered intermediate light distribution (and in this respect, suitable as a surrogate light source) is to be generated in a plane, which is sharply depicted by the secondary lens 12 in the light distribution 18 conforming to government-mandated regulations. To that end, the primary lens 30 generates a closed, coherent illuminated surface area from the light emission surfaces of the SMD-LEDs 29 that are adjacent to one another at a spacing, whereby the SMD-LEDs 28 are disposed in one or more parallel rows. A lens array 30, including of collecting lenses, reflectors, or conical optical fibers is then placed in front of the LED array such that the light emission surfaces are illuminated in a uniform and homogenous manner to the greatest extent possible, and the emitted beam bundle exhibits no gaps.

Figure 3A:
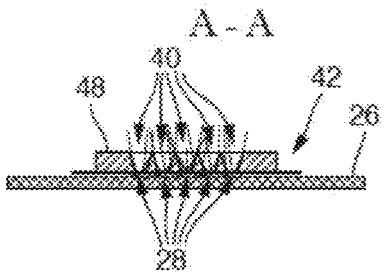
FIGS. 3A-3D show different views of an assembly having a printed circuit board, LEDs, and a primary lens having sub-regions implemented as reflectors.
Figure 3B:
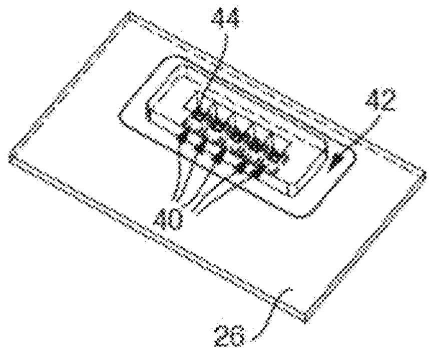
Figure 3C:
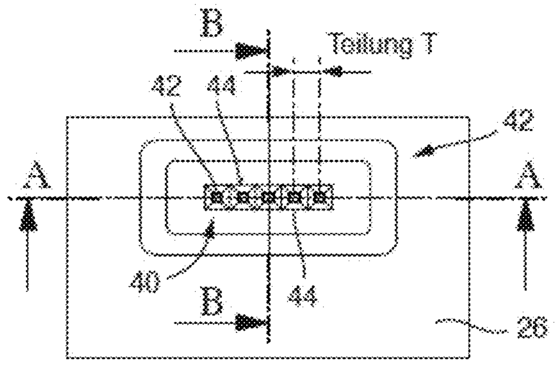
Figure 3D:
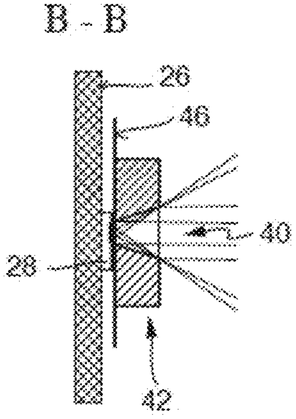

FIGS. 3A-3D show a primary lens array 30 including reflectors. The reflector sub-regions 40 are realized as recesses, bordering one another without spacings, in a single-piece base body 42. FIG. 3B shows a perspective view of the assembly comprising the printed circuit board 26 and the reflector sub-regions 40, which cover the LEDs allocated thereto. FIG. 3A shows a cut through this assembly, running in the direction of the configuration of the rows. FIG. 3D shows a cut through this assembly, running transversely to the configuration of the rows, and FIG. 3C shows a top view and a position of the specified cuts. The reflector sub-regions have rectangular, in particular quadratic, cross-sections thereby. The light emission surfaces of the individual reflectors 40 are disposed in a row without gaps, and are therefore without spacing to one another, and border the resulting illuminated surface with sharp, straight edges 44. One reflector 40 is allocated to each SMD-LED 28. The midpoints of the reflectors 40 and the midpoints of the light emission surfaces of the light sources 28 have the same spacings. The configuration of the reflectors 40 in rows therefore has the same distribution as the configuration of the LEDs 28 in rows. In one embodiment, a heat shield 46 is disposed between the reflector sub-regions and the LED, which protects the back surface of the reflector sub-region 40 of the lens array 30 from radiation. The heat shield 46 is interrupted above the light emission surfaces of the SMD-LEDs 28, in order to allow for light emission. In particular, FIGS. 3A, 3B, and 3D show an array of reflectors 40 expanding conically toward the light emission, having quadratic or rectangular cross-sections, wherein a cross-section of this type is disposed perpendicular to the lens axis and thus perpendicular to the main beam direction of the LEDs 28. The reflector sub-regions 40 may have the depicted geometry of a truncated pyramid. As depicted in FIGS. 3A-3D, the reflector sub-regions 40 and the respective light sources 28 allocated individually thereto are disposed in one or more rows. Furthermore, the reflector sub-regions 40 are identical to one another, and their light emission surfaces border one another without spacings, such that their light emission surfaces are bordered by at least one straight line 44. FIG. 3B shows a lower edge 44 of the light emission surface of the configuration of rows of reflectors as well, that is to be depicted as a light/dark border.

Figure 4A:
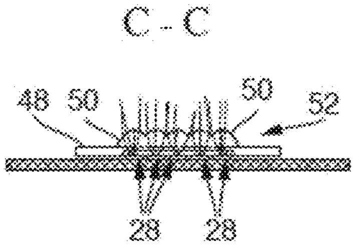
FIGS. 4A-4G show different views of an assembly having a printed circuit board, LEDs, and a primary lens having sub-regions implemented as collecting lenses.
Figure 4B:
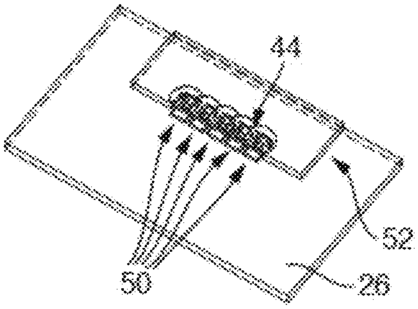
Figure 4C:
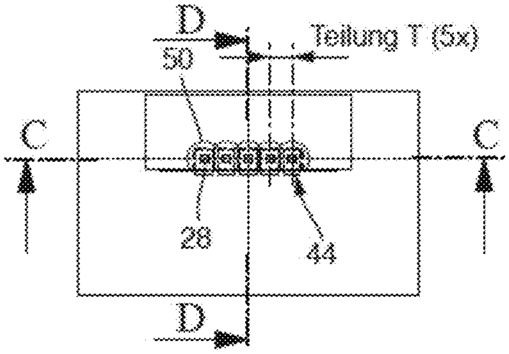
Figure 4D:
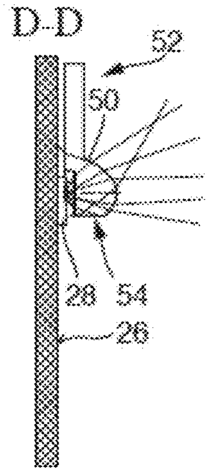
Figure 4E:
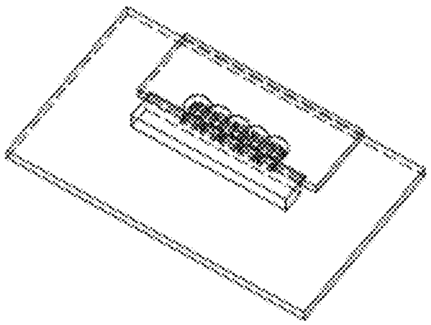
Figure 4F:
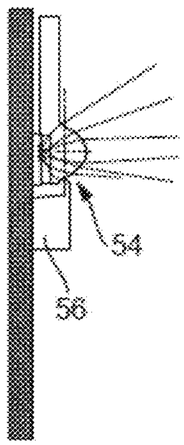

FIGS. 4A-4G show the focal plane 48 of the secondary lens 12, lying in a plane with the intermediate light distribution, which is depicted as a light emission surface of the reflectors 40. Moreover, FIGS. 4A-4G are comparable to what is shown in FIGS. 3A=3D, except that the primary lens array includes collecting lenses. The collecting lens sub-regions 50 are realized here as sub-regions, bordering one another without spacings, of a single-piece transparent base body 52. The single-piece base body 52 may include one of the materials specified above. FIG. 3B shows a perspective view of the assembly including the printed circuit board 26 and the collecting lens sub-regions 50, as well as the LEDs 28 allocated thereto. FIG. 3A shows a cut through this assembly, running in the direction of the configuration of rows. FIG. 3D shows a cut through this assembly, running transversely to the configuration of rows, and FIG. 3C shows a top view and a position and orientation for the specified cuts. A collecting lens sub-region 50 is individually allocated to each light source 28. For comparison, see FIG. 4C. The lens array is bordered on at least one edge by, at least in sections, a flat lateral surface 54, at which a portion of the beam path is reflected. This is visible in FIG. 4D. Alternatively, this edge 54 can also be formed by an aperture shutter 56, placed directly in front of the light emission surface of the lens array in the beam path. This is depicted in FIGS. 4E and 4F. FIG. 4E shows a primary lens array of collecting lenses 50 having additional aperture shutters 56. These cover an edge of the primary lens, in order to form a sharp border, to the greatest extent possible, for the light emission surface. This aperture shutter creates a particularly sharp border for the light emission surface in that is blocks all of the diffused light that passes by the light emission surface. The secondary lens focuses directly on the edge of the aperture shutter to the greatest extent possible in this case. If a low beam light distribution having, at least in sections, a light/dark border running horizontally, is to be generated, then the aperture shutter edge runs along the lower border of the light emission surface of the primary lens, using which the light/dark transition in the light distribution is then formed by the secondary lens. The intermediate light distribution lies in the lens array in the region of the lens body. The focal point of the secondary lens lies, in FIG. 4F, on the edge of the aperture shutter 54. The design having the lens array is advantageous. The aperture shutter can also be used in conjunction with the rest of the designs for primary lenses proposed in this application.

Figure 4G:
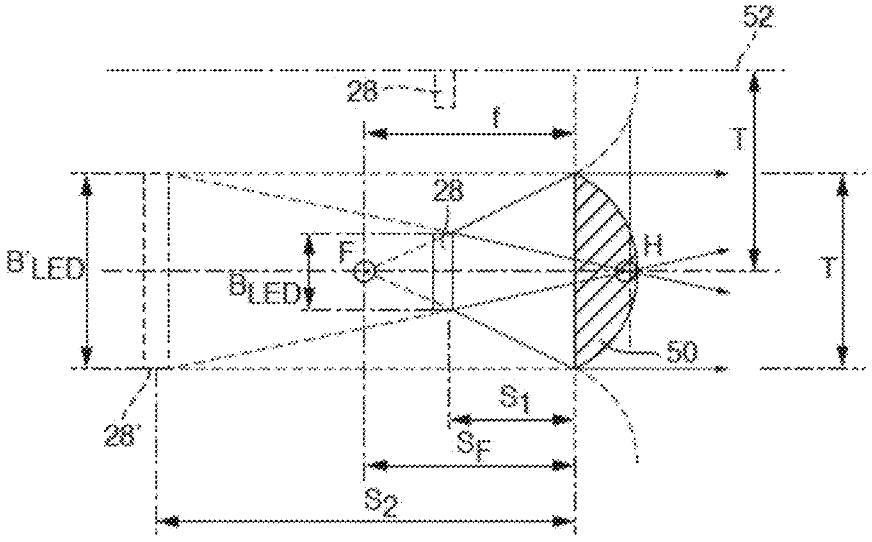
Figure 5A:
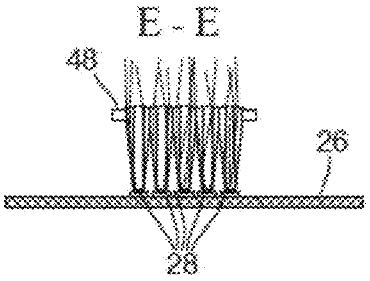
FIGS. 5A-5D show different views of an assembly having a printed circuit board, LEDs, and a primary lens having sub-regions implemented as optical fibers.
Figure 5B:
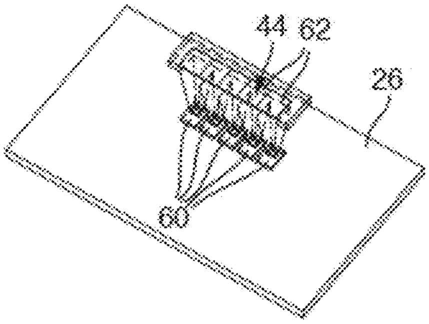
Figure 5C:
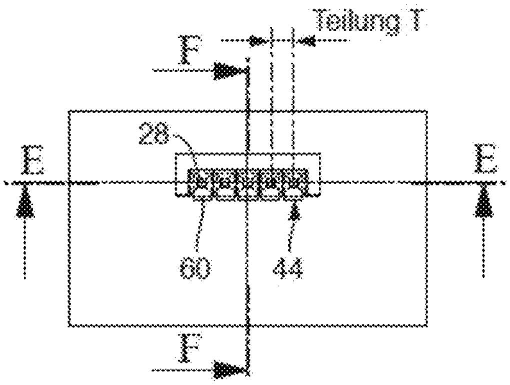
Figure 5D:
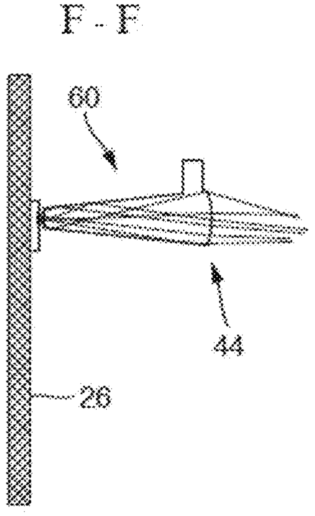

As is depicted in FIGS. 4A-4G, the collecting lens sub-regions 50, as well as the respective light sources 28 individually allocated thereto, are disposed in one or more rows. Furthermore, the collecting lens sub-regions 50 are identical to one another, and their light emission surfaces border one another without spacing, such that their light emission surfaces are bordered by at least one straight line 44. FIG. 4G shows a configuration of a pair of one of a plurality of semiconductor light sources 28 in the form of an LED chip, and a collecting lens sub-regions 50 of the base body 52 that collects the light from this chip. A division of the base body 52 is indicated by T (Teilung). The division T corresponds to the width of the individual collecting lens sub-regions 50 as well as the spacing of the midpoints of adjacent LED chips 28. An edge length of the LED chip 28 is indicated by BLED. A virtual LED chip is indicated by 28'. The edge length of the virtual LED chip 28' is indicated by B'LED. An object-side focal point of the collecting lens sub-region 50 is indicated by F, and a main point of the collecting lens sub-region 50 is indicated by H. The main point H of a lens is defined as an intersection of a main plane of the lens with the lens axis. The secondary lens 4 of the light module 1 of the invention may be focused on a main point H of one of the collecting lens sub-regions 50, on the main point H of the collecting lens sub-region 50 located in the proximity of an lens axis of the light module. The reference symbol f indicates the focal length of the collecting lens sub-region 50 and SF indicates a sectional focal length of the collecting lens sub-region 50. A spacing between the LED chip 28 and the light entry surface of the collecting lens sub-region 50 is indicated by S1, and a spacing between the virtual chip image 28' and the light entry surface of the collecting lens sub-region 50 is indicated by S2.

The LED chip 28 lies between the collecting lens sub-region 50 and its object-side focal point F. The LED chip 28 is enlarged by the collecting lens sub-region 50 such that the (upright) virtual image 28' of the chip (in front of the object-side lens focal point F, in the direction of the light emission) is basically the same size as the collecting lens sub-region 50, i.e. B'LED≈T. For the given variables, the following relationships form an approximation:

$$\frac{S_F - S_1}{S_F}\frac{B_{LED}}{T}$$

$$0.1\text{ mm} \leq S_1 \leq 2\text{ mm};$$

$$1 \times B_{LED} \leq T \leq 4 \times B_{LED}$$

The collecting lens sub-regions 50 of the base body 52 do not serve to generate real intermediate images of the light sources 28, but instead, merely form an illuminated surface on the light emission side 25 of the collecting lens sub-regions 50. The light sources 28 are disposed between the light entry surfaces of the collecting lens sub-regions 50 and the object-side focal points F of the collecting lens sub-regions 50, such that the edges of the light sources 28 lie on geometric connections from the focal points F to the lens edges. The emission surfaces of the light sources 28 are disposed perpendicular to the lens axes of the collecting lens sub-regions 50. As a result, a very uniform illumination of the collecting lens sub-regions 50 is obtained, and a particularly homogenous light distribution, the so-called intermediate light distribution, is obtained on the light emission surfaces of the collecting lens sub-regions 50. These intermediate light distributions are imaged by the secondary lens to generate the resulting overall light distribution of the light module on the roadway in from of the vehicle. The lens axes of the individual collecting lens sub-regions 50 of the base body 52 all run on a plane, and may be parallel to one another. The axis of the secondary lens is on the side facing the base body 52, parallel to the axis of at least one of the collecting lens sub-regions 50. The LEDs, in particular between their respective collecting lens sub-region and the paraxial focal point thereof, are configured such that an intermediate light distribution without gaps is created, composed of the virtual images of the light emission surfaces of the individual chips. The light from the LED here is first emitted into air, and only then strikes the associated collecting lens sub-region. This differs from the prior art, in which LEDs having transparent casting compounds are used, wherein the casting compound may have a lens effect on the chip.

FIGS. 5A-5D show another design of the primary lens array, wherein the primary lens array includes optical fibers 60 having conical cross-sections expanding toward the light emission, which are perpendicular to the main expansion direction of the light in the optical fibers, and thus oriented perpendicular to the respective lens axes, and which are rectangular, in particular quadratic. The light emission surfaces 62 of the individual optical fibers 60 are disposed in rows, without gaps, and border the illuminating surfaces with sharp, straight edges 44, which in this case are the lower edges 44. One optical fiber 60 is individually allocated to each LED 28. The light entry surface may be flat and parallel in front of the LED chip. The optical fibers 60 are disposed in one or more rows, like the allocated light sources, such that the light emission surfaces, in turn, are bordered by at least one straight line 44. The light emission surface may be curved in a convex manner. The optical fiber array may be produced from one of the materials specified above. The optical fiber array may be produced as a single-piece base body, with the optical fibers forming light conducting sub-regions.

For all three designs for the primary lens array, in the form of an array of reflector sub-regions 40, collecting lens sub-regions 50, and optical fiber sub-regions 60, the sum of the light emission surfaces for the respective sub-regions forms the closed, coherent intermediate light distribution and surrogate light source. Disregarding the losses through absorption and Fresnel reflection, the surrogate light source exhibits light densities similar to that of the chips in the individual LEDs. Thus, a surrogate light source of this sort also exhibits uniformly distributed light densities and emission angles similar to individual LEDs over its entire light emission surface. Moreover, the surrogate light source can be regarded in the following like an LED array. The light distribution formed in this manner then serves as a surrogate light source for a downstream secondary lens, which is a collecting lens, or a reflector having parabolic reflection surfaces (at least in sections) which forms a low beam light distribution through the use of this surrogate light source. The surrogate light source should be oriented similarly, to the greatest extent possible, to the light/dark border of the low beam light distribution (specifically, at least in sections, horizontally), in order to obtain a sharp light/dark border (higher illumination gradient). For this reason, all of the reflectors are also disposed in the beam path such that the beam path is reflected at the respective reflectors at an angle that is acute (<90°) to the greatest extent possible, and the orientation of the images of the surrogate light source remains substantially parallel to the light/dark border. The secondary lens may be a faceted parabolic reflector disposed in the beam path such that the surrogate light source projects into the reflector from the front, such that the beam path is deflected at an acute angle. The at least one focal point of the reflector lies thereby on the edge of the surrogate light source. To generate a low beam light distribution, this is the lower edge of the surrogate light source. As described, this edge can additionally be shaded by an aperture shutter, in order to prevent diffused light from entering the dark field of the light distribution. If the secondary lens has numerous reflector facets, then their focal points lie, in turn, on the edges of the surrogate light source, but are positioned according to the position and orientation of the facets, advantageously at different ends of the light source edges. If the light source projects into the reflector from below, then the respective parabolic facets have their focal points in the same half-space bordered by the meridional plane. If the light source projects into the reflector from above, then the focal points of the parabolic reflectors lie on the other side of the meridional plane from the reflector facets themselves. In this manner, it is ensured that the images of the surrogate light source adjoin the next corner lying on the low beam light/dark border, and no portion of the light source images enters the dark field of the light distribution.

The secondary lens does not focus on the chip plane of the LEDs, but rather on the lower edge of the light emission surface of the primary lens. The light emission surface can be particularly sharply bordered if an aperture shutter is disposed along the edge of the light emission surface, which blocks all of the light that would be diffused past the light emission surface. The secondary lens focuses in this case directly, to the greatest extent possible, on the edge of the aperture shutter. If a low beam light distribution, having a light/dark border running at least in sections horizontally, is to be generated, then the aperture shutter edge runs along the lower edge of the light emission surface of the primary lens, using which, then, the light/dark transition of the light distribution is formed by the secondary lens. The reflector surface of the secondary lens may include numerous reflector facets, each of which has surfaces implemented as paraboloids of revolution. The different paraboloids have different focal points, all of which lie on the lower edge of the light emission surface of the primary lens, and this being at their edges (corners), wherein the focal points lie in the same hemisphere as the associated facet surfaces. The axes of the paraboloid of revolution, on which the reflector facets are based, face toward the low beam light/dark border. In this way, the light source edge is imaged as a light/dark border for the light distribution.

In one embodiment, the reflector facets are designed as toric surfaces, instead of paraboloids of revolution: for this, the curvature of the paraboloid of revolution, in sections parallel to the light/dark border (or, respectively, to sections of the light/dark border), is increased or reduced through the focal point of the paraboloid, such that instead of the focal point, a focal line is obtained, which runs parallel to the low beam light/dark border, or, respectively, to sections of the low beam light/dark border. The diffusion can also be obtained with diffusing cylindrical lenses, which are placed on the facet surfaces, and the cylinder axes of which are perpendicular to the main beam and low beam light/dark border. If an asymmetrical low beam light/dark border having an incline is to be generated, then this incline is generated by a reflector facet lying as close as possible to the edge of the reflector surface, as discussed in greater below with reference to FIGS. 8A-8B.

Figure 6A:
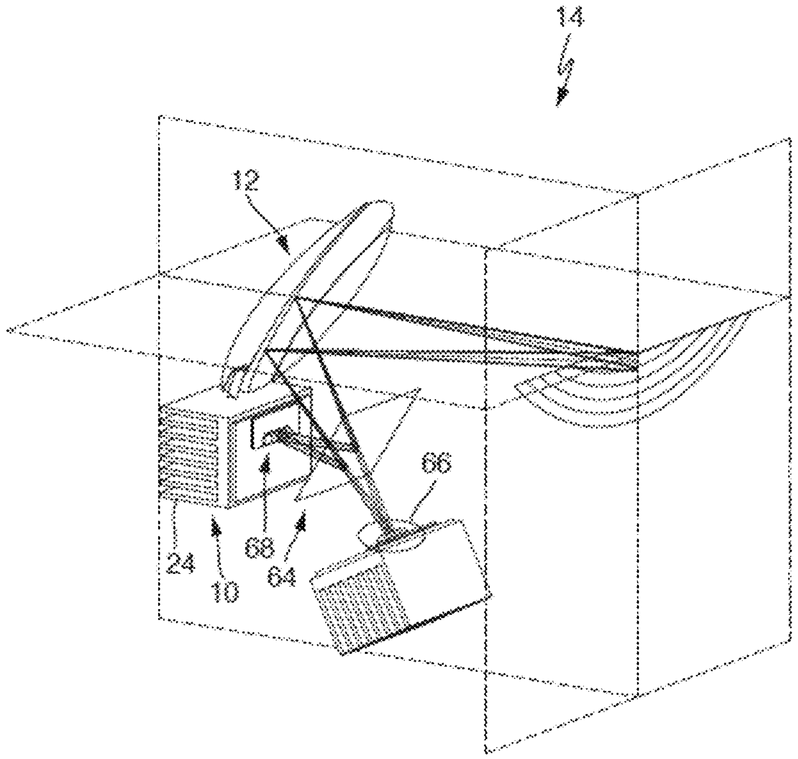
FIGS. 6A-6B show perspective and side-view depictions, respectively, of an embodiment example of a light module according to the invention, exhibiting a light path bent at an additional deflecting mirror.
Figure 6B:
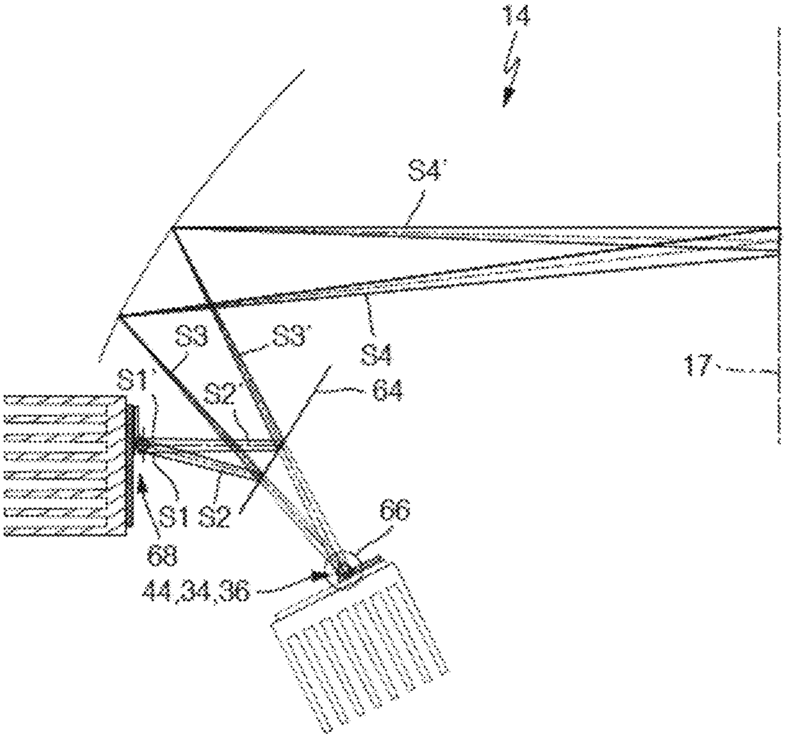

FIGS. 6A-6B show designs for light modules 14 according to the invention having a deflecting mirror, which forms an additional bend in the beam path. This measure serves to shorten the installation space for the light module, and to create an additional degree of freedom for being able to configure the components of the light module freely, to the greatest extent possible. Thus, it offers constructive advantages when the light module 10 projects forwards in the direction of travel (light projection direction) and the cooling of the light source via a cooling element 24 occurs toward the back: a light source of this type can be replaced from the back of the headlamp in a simple manner. Furthermore, the cooling element can be more easily ventilated on the back of the light module, thus improving the cooling effect. Moreover, one obtains a compact light module, the balance point of which lies in the proximity of the light emission surface, thus facilitating the mechanical pivoting of the light module 14. The bending of the beam path is also convenient because the refraction power with the proposed lens system is divided between the primary and secondary lenses, such that one obtains secondary lenses with less refraction power, for example with a longer focal length (the focal lengths are 2-3 times greater than with single-stage systems). The deflection mirror 64 is designed as a hyperboloid, wherein the hyperboloid should expressly include the special case of the flat mirror. The described characteristics of the secondary lens 12 refer in this case to the lens system 64, 12 including the deflecting mirror 64 and the secondary lens 12, which then focuses with one or more focal points on the lower edge of the surrogate light source. The deflection mirror 64 generates at least one virtual intermediate image 66 of the surrogate light source 68 thereby. The surrogate light source 68 lies in the object-side Petzval surface of the hyperbolic deflection mirror thereby, while the focal point or points of the secondary lens 12 lie in the image-side Petzval surface of the hyperboloid (for example, the secondary lens 12 focuses) not on the real surrogate light sources 68, but instead, on their virtual image 66.

FIG. 6A shows a low beam light module 14 of this type, having a projection that has been bent a second time by a deflection mirror 64. The deflection mirror 64 generates a virtual image 66 of the surrogate light source 68. The focal points of the secondary lens 12 may thus lie, as has been explained in conjunction with the FIGS. 1A-1B, at the corners of the primary lens. In the case depicted in FIG. 6A, the secondary lens does not focus on the real primary lens, but instead, on the corners of the virtual image of the primary lens serving as the surrogate light source 66. FIG. 6B likewise shows a low beam light module 14, having a beam path that has been bent a second time by a deflection mirror 64. The deflection mirror 64 generates a virtual image 66 of the surrogate light source 68. The focal points of the secondary lens 12 then lie on the lower edge 44 of the virtual image 66 of the surrogate light source 68. The deflection mirror 64 shortens the structural length and thus enables a particularly compact construction of the light module 14.

The lens system, including a deflection lens 64 and secondary lens 12 may be designed such that the condition, $\Sigma_i^n s_i \cdot n_i$=constant, applies for all lens paths si, which connects the object-side focal points 34, 36 of the secondary lens, which has been divided into two parts by the additional deflection mirror 64, with the shared object-side focal point lying in infinity. In one design, at least one of the two mirrors has one or more facets. A lens system including a deflection lens 64 and a secondary lens 12, fulfilling the condition, $\Sigma_i^n s_i \cdot n_i$=constant, does not necessarily need to deliver a sharp virtual intermediate image 66, because aberrations (blurring, distortion, aperture malfunction) in the intermediate image can be compensated for by the downstream secondary lens 12.

Figure 7A:
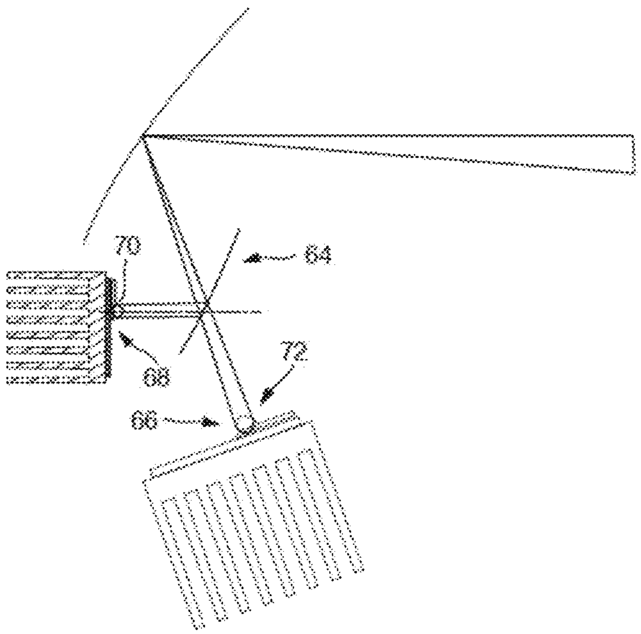
FIGS. 7A-7B show side views of the light module of FIG. 6, having different designs for the deflecting mirror.
Figure 7B:
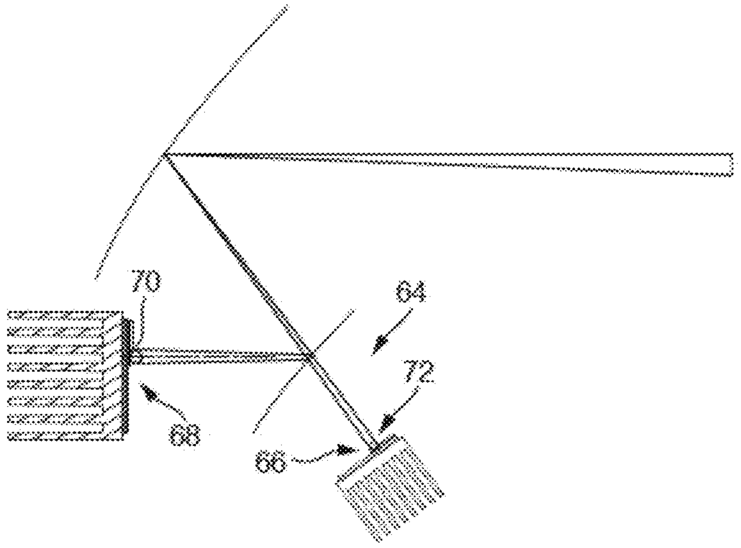

With respect to the deflection mirror 64, five designs have been distinguished. In a first design, the deflection mirror 64 is a flat mirror. This is shown in FIGS. 6A-6B. FIG. 7A shows a second design having a deflection mirror 64 that is concave and therefore has a collecting effect. The shape may be a hyperbolic shape. Because of the collecting characteristic, the virtual intermediate image 66 is an enlarged image of the surrogate light source 68 here. The first hyperbolic focal point 70 lies on the lower edge of the real primary lens of the real surrogate light source 68. The second hyperbolic focal point 72 lies on the lower edge of the virtual intermediate image 66 of the surrogate light source. FIG. 7B shows a third design having a deflection mirror 64 that is convex and therefore has a dissipative effect. The shape may be a hyperbolic shape. Because of the dissipative characteristic, the virtual intermediate image 66 is a reduced image of the surrogate light source 68 here. The first hyperbolic focal point 70 lies on the lower edge of the real primary lens for the real surrogate light source 68. The second hyperbolic focal point 72 lies on the lower edge of the virtual intermediate image 66 of the surrogate light source 68. FIGS. 7A-7B show, in this respect, designs having a hyperboloid as the deflection mirror 64, having an object-side focal point 70 and an image-side focal point 72, and having a faceted secondary lens (advantageously), which includes the deflection mirror and the additional mirror 12, and the numerous object-side focal points, and an image-side focal point that extends into infinity. The focal points for this secondary lens 12 lie on the lower edge of the virtual image 66 of the surrogate light source 68. This image is, in contrast to the flat mirror, enlarged or reduced, depending on whether the deflection mirror 64 is a concave or convex hyperboloid. In a fourth design (not shown), the light module contains numerous flat deflection facets and a secondary lens having a single object-side focal point. The faceted deflection mirror divides the beam path of the secondary lens, and thus generates a lens system having numerous focal points, in a manner similar to that with a faceted parabolic reflector. The faceted deflection mirror generates numerous virtual images of the surrogate light source which are pushed against one another. The focal points of the two-part secondary lens focus, as described above, on the edge of the surrogate light source. In a fifth design (not shown), the light module has a faceted hyperboloid as the deflection mirror, having an object-side focal point, and numerous image-side focal points. The secondary lens should, in this case, have an object-side and an image-side focal point (the later extending into infinity). The faceted hyperboloid generates virtual images of the light source that are pushed against one another, enlarged (concave hyperbolic mirror) or reduced (convex hyperbolic mirror), depending on whether the hyperbolic mirror is concave (and thus enlarging), or convex (and thus reducing) in shape.

Figure 8A:
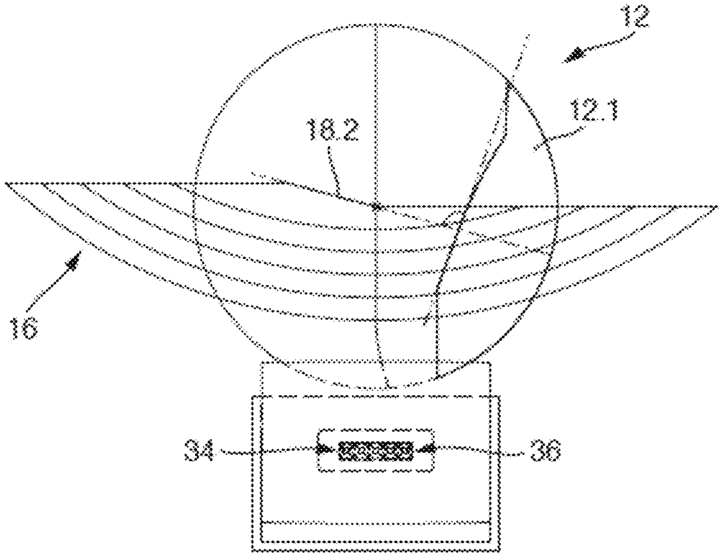
FIGS. 8A-8B show front views of two designs for the light module according to the invention, having configurations of the surrogate light source according to the alternatives of FIGS. 1 and 2, respectively.
Figure 8B:
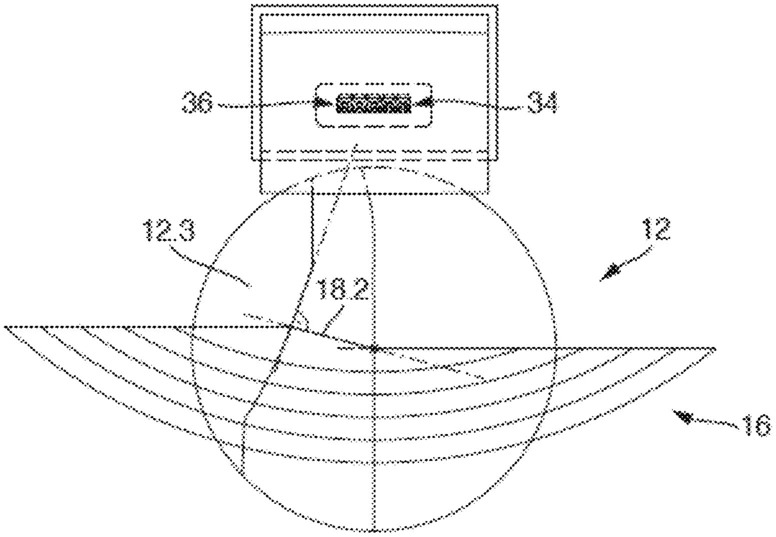

FIGS. 8A-8B show front views of designs for the light module, as would be seen by an observer standing in front of the light module in the projection direction of the light module, and looking toward the light module. Both in the case of FIG. 8A and in the case of FIG. 8B, the reflector serving as the secondary lens has a parabolic shape with three facets in a region of its reflector surface that is greater than half of its entire reflecting surface. FIG. 8A shows, in particular, a design in which the facet 12.1 at the right hand reflector edge, when seen from the direction of viewing, generates the asymmetric incline 18.2 of the light/dark border in the light distribution 16. The facet 12.1 is disposed such, in particular, that the light source images are tilted toward the incline. As a result, the facet 12.1 generates light source images having an orientation, which generate the desired incline in the light/dark border in the sum of the light source images. The example depicted in FIG. 8A is suited for right hand traffic. If the light source projects into the reflector from below, as is the case with the subject matter of FIG. 8A, then the facet 12.1 does not lie on the same side of the meridional plane as the incline 18.2. The facet edge runs, in sections, perpendicular to the incline. FIG. 8B shows, in particular, a design in which the facet 12.3 on the left hand reflector edge generates the incline in the light/dark border in the light distribution. If the light source projects into the reflector from above, as is the case with the subject matter in FIG. 8B, then the facet 12.3 lies on the same side of the meridional plane as the incline 18.2 itself. The facet edge runs, in sections, perpendicular to the incline.

Figure 9A:
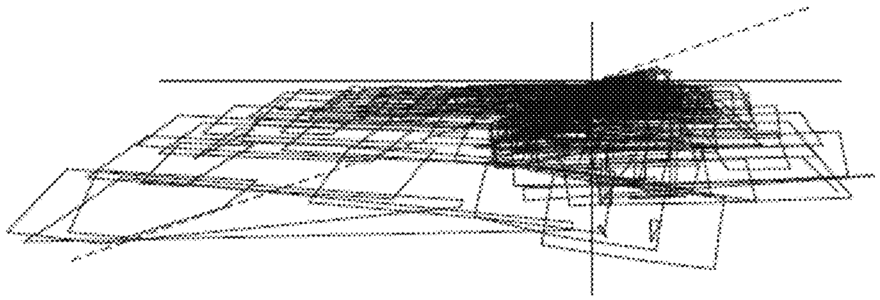
FIG. 9A shows a low beam light distribution generated in the foreground of the light module by an embodiment example of a light module according to the invention.
Figure 9B:
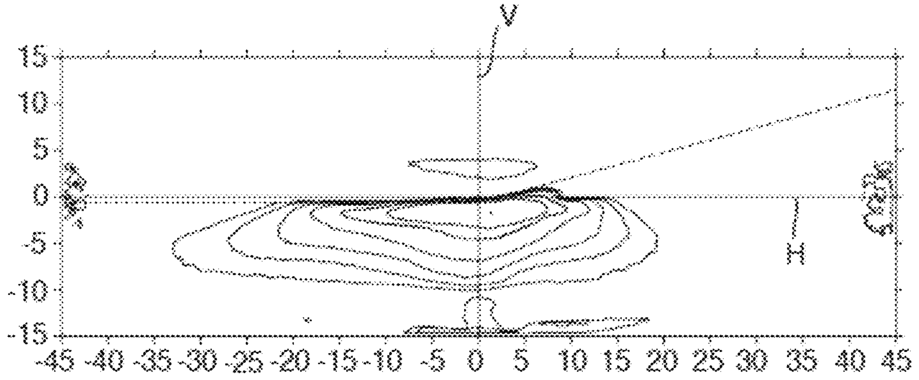
FIG. 9B shows a schematic depiction of light source images, from which the low beam light distribution of FIG. 9A is composed.

FIG. 9B shows a low beam light distribution for one design of a light module according to the invention, as it is obtained on a screen placed in front of the vehicle. The horizontal line H lies at the level of the horizon. The vertical line V crosses the horizontal line in the extension of the main beam direction of the light module. The deviations from point HV=(0, 0) are given in angular degrees, respectively. Closed curves are, in each case, lines having a constant luminosity, wherein the luminosity from one line to the next increases from the outermost to the innermost. The resulting incline to the right of point HV=(0, 0) shows that this concerns a light module for right hand traffic. FIG. 9A illustrates how the light distribution shown in FIG. 9B is obtained as a superimposing of the light source images 74. Each light source image is generated by a small portion of the reflecting surface of the secondary lens. The depiction in FIG. 9A is purely schematic in this regard. The light source images are oriented substantially horizontal, or parallel to the light/dark border, respectively. The facet generating the incline is designed, in contrast thereto, such that it produces light source images, the edges of which lie parallel to the desired course of the incline. The primary lens enlarges the light emission surface by a factor that basically corresponds to the quotients of the division of the lens array and the lateral length of a single chip. This results from the surrogate light source having a uniform brightness. The focal length of the secondary lens may correspond to 50×-200× the lateral length of a single chip, in particular 80×-100× the specified lateral length.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A light module for a motor vehicle headlamp, having numerous light emitting diodes as light sources, a primary lens having a lower edge, and a secondary lens, wherein the primary lens collects light emitted from the light sources, and to convert the light into an intermediate light distribution having a shape of a closed and illuminating surface area, and wherein the secondary lens has an object-side focal length and at least one concave mirror reflector having a reflector surface that includes a plurality of reflector facets which are implemented as paraboloids of revolution which have different focal points, all of which lie on the lower edge of the light emission surface of the primary lens, wherein the primary lens and the secondary lens are disposed such that the intermediate light distribution lies in a beam path in front of the secondary lens at a spacing of the object side focal length, and the primary lens is a single-piece base body including collecting lens sub-regions, and a chip in the light emitting diode lies between a collecting lens sub-region that collects light from the light emitting diode and an object-side focal point of the light emitting diode, wherein light emission surfaces of the light sources are separated from one another by spacings therebetween, and the primary lens distributes light emitted from the light sources such that the spacings in the intermediate light distribution cannot be perceived.

2. The light module as set forth in claim 1, wherein the primary lens has a dedicated sub-region functioning as a lens for each light source, each of which has a light emission surface, and wherein the light emission surfaces border one another without gaps, and wherein at least two adjacent light emission surfaces border one another such that at least one lateral edge of a first of two adjacent light emission surfaces lies in a line flush with a lateral edge of the second of the two adjacent light emission surfaces, such that the two flush edges form a shared, straight edge.

3. The light module as set forth in claim 2, wherein each sub-region is a collecting lens.

4. The light module as set forth in claim 2, wherein each sub-region is a reflector.

5. The light module as set forth in claim 2, wherein each sub-region is an optical fiber.

6. The light module as set forth in claim 1, wherein the light module has an aperture shutter disposed in the beam path directly behind the light emission surface, such that the aperture shutter blocks a portion of the intermediate light distribution.

7. The light module as set forth in claim 1, wherein a lens surface of the secondary lens is divided into a larger sub-region and a smaller sub-region, wherein the larger sub-region has a first object-side focal point, and the two sub-regions have a common image-side focal point extending toward infinity.

8. The light module as set forth in claim 1, wherein the concave minor reflector has a reflecting surface, a larger portion of which has a parabolic form, wherein an object-side focal point of the parabolic form lies on the light emission surface of the primary lens.

9. The light module as set forth in claim 1, wherein the secondary lens includes two mirrors disposed in the beam path behind one another such that the mirrors bend the beam path of the secondary lens twice at an acute angle, and the secondary lens has an object-side focal point that lies on the light emission surface of the primary lens, and the secondary lens has an image point that lies in infinity.

10. The light module as set forth in claim 9, wherein the first mirror in the beam path in the direction of propagation of the light is a hyperboloid, and the second minor is a paraboloid, wherein the object-side focal point of the hyperboloid forms the object-side focal point of the secondary lens, and the image-side focal point of the hyperboloid coincides with the focal point of the paraboloid and marks the position and orientation of a virtual intermediate image of the intermediate light distribution.

11. The light module as set forth in claim 9, wherein the first mirror of the two-stage secondary lens is a hyperboloid, or a flat mirror, as a special case of the hyperboloid, and the second mirror is a faceted paraboloid, wherein the object-side focal point of the hyperboloid forms the object-side focal point of the secondary lens, and wherein the image-side focal point of the hyperboloid marks the position and orientation of a virtual intermediate image of the intermediate light distribution, and wherein the downstream parabolic facets are configured to focus on the edge of the virtual images of the intermediate light distribution.

12. The light module as set forth in claim 9, wherein the two mirrors have a plurality of object-side focal points which lie on the edge of the intermediate light distribution, and their image point, or image lines, respectively, lie on the light/dark border of the light distribution, extending into infinity, wherein the two mirror surfaces are shaped such that all optical paths between the object-side focal point and its respective image points, or image lines, respectively, are of the same length.

13. The light module as set forth in claim 1, wherein the secondary lens has a plurality of object-side focal points and one or more shared image-side focal points or focal lines extending into infinity.

14. The light module as set forth in claim 1, wherein the first mirror of the two-stage secondary lens is a faceted hyperboloid, or is a faceted flat mirror, as the special case thereof, and the second mirror is a paraboloid, wherein the object-side focal point of the hyperboloid forms the object-side focal point of the secondary lens, and wherein the image-side focal point of the hyperboloid marks the position and orientation of a virtual intermediate image of the intermediate light distribution, and wherein the parabolic facets disposed downstream in the beam path focus on the edge of the virtual image of the intermediate light distribution.

* * * * *